US011163165B1

(12) United States Patent
Trail

(10) Patent No.: US 11,163,165 B1
(45) Date of Patent: *Nov. 2, 2021

(54) DIRECTED DISPLAY ARCHITECTURE

(71) Applicant: Facebook Technologies, LLC, Menlo Park, CA (US)

(72) Inventor: Nicholas Daniel Trail, Bothell, WA (US)

(73) Assignee: Facebook Technologies, LLC, Menlo Park, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/923,299

(22) Filed: Jul. 8, 2020

Related U.S. Application Data

(63) Continuation of application No. 14/944,495, filed on Nov. 18, 2015, now Pat. No. 10,761,327.

(51) Int. Cl.
*G02B 27/01* (2006.01)
*G02B 19/00* (2006.01)
*G02B 5/02* (2006.01)
*G02B 3/00* (2006.01)

(52) U.S. Cl.
CPC ....... *G02B 27/0172* (2013.01); *G02B 3/0043* (2013.01); *G02B 5/0257* (2013.01); *G02B 19/0004* (2013.01); *G02B 2027/0118* (2013.01)

(58) Field of Classification Search
None
See application file for complete search history.

(56) References Cited

U.S. PATENT DOCUMENTS

| | | | |
|---|---|---|---|
| 5,546,492 | A | 8/1996 | Ansley et al. |
| 6,215,593 | B1 | 4/2001 | Bruce |
| 2004/0130783 | A1 | 7/2004 | Solomon |
| 2004/0161192 | A1 | 8/2004 | Hamano et al. |
| 2006/0033992 | A1 | 2/2006 | Solomon |

(Continued)

FOREIGN PATENT DOCUMENTS

WO  WO 2014/053562 A1  4/2014

OTHER PUBLICATIONS dictionary.com. "Adjacent." dictionary.com, Nov. 18, 2011, 1 page, [Online] [Retrieved Nov. 18, 2011], Retrieved from the internet <URL:https://dictionary.reference.com/browse/adjacent>.

(Continued)

*Primary Examiner* — Nicholas J Lee
(74) *Attorney, Agent, or Firm* — Fenwick & West LLP

(57) ABSTRACT

A head-mounted display (HMD) includes an electronic display element, a microlens array, and an optics block. The electronic display element outputs image light via sub-pixels having different colors, the sub-pixels separated from each other by a dark space region. The sub-pixels have associated emission distributions that describe ranges of angles of light emitted from the plurality of sub-pixels. The microlens array includes microlenses that are each coupled to at least one corresponding sub-pixel, of the sub-pixels, where the microlenses concentrate the emission distributions and direct the emission distributions toward a target region. The optics block, which is located in the target region optically corrects the image light and directs the optically corrected image light from the microlens array to an exit pupil of the HMD corresponding to a location of an eye of a user of the HMD.

20 Claims, 6 Drawing Sheets

(56) References Cited

U.S. PATENT DOCUMENTS

| | | |
|---|---|---|
| 2009/0225154 A1 | 9/2009 | Raymond et al. |
| 2010/0033813 A1 | 2/2010 | Rogoff |
| 2010/0214635 A1 | 8/2010 | Sasaki et al. |
| 2011/0007277 A1 | 1/2011 | Solomon |
| 2011/0102372 A1 | 5/2011 | Han et al. |
| 2011/0157667 A1 | 6/2011 | Lacoste et al. |
| 2013/0257689 A1 | 10/2013 | Hotta et al. |
| 2014/0320974 A1 | 10/2014 | Magyari |
| 2015/0253469 A1 | 9/2015 | Le Gros et al. |
| 2015/0362734 A1 | 12/2015 | Moser et al. |
| 2016/0116735 A1 | 4/2016 | Hayashi et al. |
| 2016/0124154 A1* | 5/2016 | Roberts ............... G02B 6/0008 359/630 |
| 2016/0178907 A1 | 6/2016 | Chang et al. |
| 2016/0334637 A1 | 11/2016 | Saisho et al. |
| 2017/0139211 A1 | 5/2017 | Trail |
| 2017/0257588 A1 | 9/2017 | Zhou et al. |

OTHER PUBLICATIONS dictionary.com. "Next." dictionary.com, Nov. 9, 2015, 1 page, [Online] [Retrieved Jun. 3, 2019], Retrieved from the internet <URL:https://www.dictionary.reference.com/browse/next>.

\* cited by examiner

DIRECTED DISPLAY ARCHITECTURE

CROSS REFERENCE TO RELATED APPLICATIONS

This application is a continuation of co-pending U.S. application Ser. No. 14/944,495, filed Nov. 18, 2015, which is incorporated by reference in its entirety.

BACKGROUND

The present disclosure generally relates to electronic displays, and specifically relates to directed electronic displays in head-mounted displays (HMDs). Conventional display technology is designed to have a large viewing angle. This is usually done by designing the display to act as a Lambertian source. A Lambertian source is defined as a source whose emission distribution is such that the apparent brightness (or luminance) is independent of angle—in other words, the off-axis luminance is the same as the on-axis. A Lambertian source (or a source with a similar emission distribution) helps minimize any variation in emitted optical light as a function of viewing angle. This is quite useful for traditional consumer electronics that are designed to be used in environments where viewers can be located at different positions relative to the display and the position of the viewer relative to the display does not cause large changes in apparent brightness.

But in the space of HMDs, a Lambertian emission distribution is largely a hindrance, as a viewing user is located at a specific position relative to the display. As a Lambertian emission pattern is designed to emit light to maximize viewing angle, a lot of the off-axis light is wasted (as it is not being directed to eyes of the user wearing the HMD, notionally located in a region defined as the "eyebox"), and therefore power used to generate the light is also wasted. Moreover, the wasted light introduces a potential for stray light, as the wasted light can scatter within the HMD and reduce the apparent contrast of media being presented by the HMD.

Moreover, HMDs may magnify an internal display to, e.g., increase a field of view for the viewing user. However, conventional displays are traditionally not meant for magnified viewing (above normal unaided vision perception limits). Accordingly, the increased magnification (versus unaided viewing) of a conventional display in a HMD can lead to the viewing user seeing the "dead-space" between the emission points of the display, which causes a "pixelated" or "screen-door" effect under use.

SUMMARY

A directed display concentrates emission distributions of sub-pixels and/or pixels towards a target region. The directed display includes an electronic display element and a microlens array that is directly affixed to the electronic display element. The microlens array includes a plurality of microlenses, and is affixed such that each microlens concentrates an emission distribution from a corresponding single sub-pixel (or pixel in some embodiments). Concentration of an emission distribution tightens an emission distribution (i.e., decreases a solid angle describing the emission distribution from a corresponding sub-pixel). Additionally, concentration of an emission distribution directs an emission distribution of a corresponding sub-pixel towards the target region. For example, concentrated emission distributions for sub-pixels along a periphery of the electronic display element are directed toward the target region, thereby increasing the amount of light emitted by the sub-pixel that makes it to the target region. In this manner, a larger percentage of light emitted from sub-pixels and/or pixels is received at the target region than would otherwise be received if no concentration of the emission distribution occurred (e.g., no microlens array). Therefore, concentration of the emission distributions causes a net increase in power of the light that reaches a viewing user, helps to hide the "screen door" effect by magnifying the apparent size of the emission area to optically fill in the dead-space (related to etendue conservation, when the emission angle is decreased), reduces potential for stray-light (i.e., light not reaching the target region that continues to scatter within the system), and allows a better uniformity across the display (as pixels near the edge are more closely matched in brightness to those near the center). Accordingly, concentration of the emission distribution results in more of the emitted light reaching the target region and preventing adverse scene conditions otherwise.

In the context of an HMD that includes an electronic display element, a microlens array, and an optics block. The electronic display element outputs image light via sub-pixels having different colors. The sub-pixels are separated from each other by a dark space region (to fit associated electronics primarily, but can be purposefully tuned with this embodiment), and the sub-pixels have associated emission distributions that describe ranges of angles of light emitted from the plurality of sub-pixels. The microlens array includes microlenses that are each coupled to at least one corresponding sub-pixel of the sub-pixels. The microlenses concentrate the emission distributions and direct the emission distributions toward a target region. The optics block is located in and around the target region, and the optics block is configured to optically correct the image light, and direct the optically corrected image light from the microlens array to an exit pupil of the HMD corresponding to a defined eyebox and the location of an eye of a user of the HMD.

There exists a trade-off between allowed brightness increase versus the ratio of the emission area versus dark space region to be "filled in." On one extreme, the microlenses can allow maximum brightness (up to completely optically filling in the dark space region) to reach the user while preserving a desired minimum eyebox size (usually equal to or larger than the human pupil diameter, notionally on the order of 10 millimeters). Here, the gain in brightness is approximated by the ratio of a unit cell dark area of a sub-pixel plus an emission area of the sub-pixel, divided by the emission area. However, as that gain is increased, the geometric and diffraction-limited eyebox size correspondingly shrink as they are related by the optical etendue of the system. On the other extreme, if the gain necessitated to reach maximum brightness to the user would result in an unacceptably small eyebox (which would imply beyond the limits of eye-tracking or no eye-tracking being involved) then it could not be fully realized and the 'screen door' effect would at least partially remain. To offset this, the gain would be set to the maximum brightness, and then diffusing optical elements would be introduced to the microlens architecture to work around the etendue limit and maintain the necessary eyebox size (while fully mitigating the screen-door effect). Accordingly, in some embodiments, the microlenses are engineered diffusing microlenses that generate blur spots in the image light that both mask the dark space region between adjacent sub-pixels and present a specified "eyebox" size. A blur spot corresponding to a blurred image of a sub-pixel in the image light. In this manner, the microlenses are able to compensate for the screen-door effect while providing for the specified eyebox conditions.

The figures depict embodiments of the present disclosure for purposes of illustration only. One skilled in the art will readily recognize from the following description that alternative embodiments of the structures and methods illustrated herein may be employed without departing from the principles, or benefits touted, of the disclosure described herein.

DETAILED DESCRIPTION

System Overview

Figure 1:
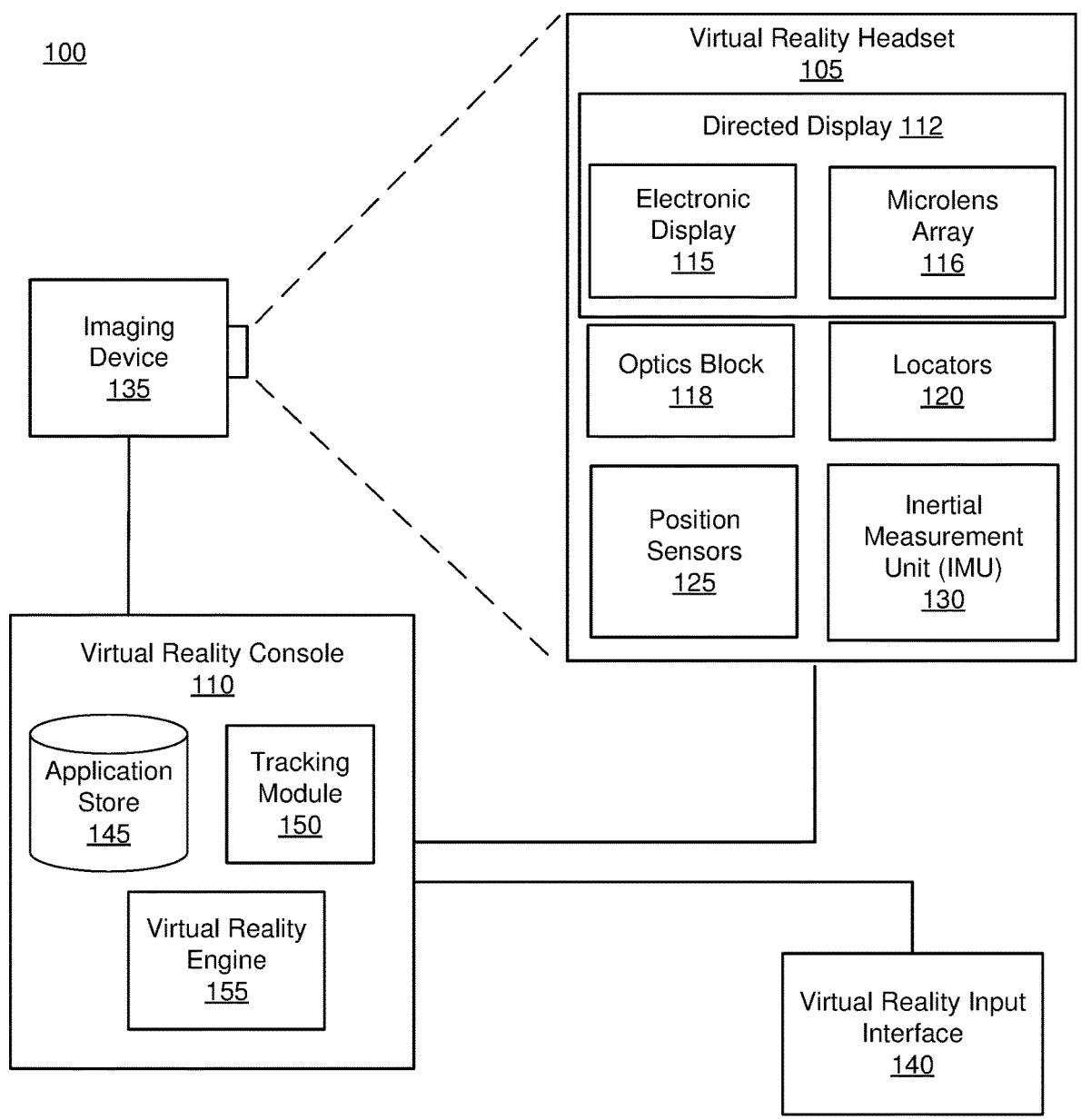
FIG. 1 is a diagram of a system environment including a virtual reality system, in accordance with an embodiment.

FIG. 1 is a block diagram of a virtual reality (VR) system environment 100 in which a VR console 110 operates. The system environment 100 shown by FIG. 1 comprises a VR headset 105, an imaging device 135, and a VR input interface 140 that are each coupled to the VR console 110. While FIG. 1 shows an example system 100 including one VR headset 105, one imaging device 135, and one VR input interface 140, in other embodiments any number of these components may be included in the system 100. For example, there may be multiple VR headsets 105 each having an associated VR input interface 140 and being monitored by one or more imaging devices 135, with each VR headset 105, VR input interface 140, and imaging devices 135 communicating with the VR console 110. In alternative configurations, different and/or additional components may be included in the system environment 100. Similarly, functionality of one or more of the components can be distributed among the components in a different manner than is described here. For example, some or all of the functionality of the VR console 110 may be contained within the VR headset 105.

The VR headset 105 is a head-mounted display that presents media to a user. Examples of media presented by the VR headset 105 include one or more images, video, audio, or some combination thereof. In some embodiments, audio is presented via an external device (e.g., speakers and/or headphones) that receives audio information from the VR headset 105, the VR console 110, or both, and presents audio data based on the audio information. Some embodiments of the VR headset 105 are further described below in conjunction with FIGS. 2 and 3. The VR headset 105 may comprise one or more rigid bodies, which may be rigidly or non-rigidly coupled to each other together. A rigid coupling between rigid bodies causes the coupled rigid bodies to act as a single rigid entity. In contrast, a non-rigid coupling between rigid bodies allows the rigid bodies to move relative to each other. In some embodiments, the VR headset 105 may also act as an augmented reality (AR) headset. In these embodiments, the VR headset 105 augments views of a physical, real-world environment with computer-generated elements (e.g., images, video, sound, etc.).

The VR headset 105 includes a directed display 112, an optics block 118, one or more locators 120, one or more position sensors 125, and an inertial measurement unit (IMU) 130. The directed display 112 directs image light toward a target region including the optics block 118, thereby increasing power of the image light that reaches the target area, reducing potential for stray-light, and increases spatial and brightness uniformity across the display (as pixels near the edge are more closely matched in brightness to those near the center). The directed display 112 includes an electronic display 115 and a microlens array 116.

The electronic display 115 presents images to the user in accordance with data received from the VR console 110. In various embodiments, the electronic display may comprise a single electronic display element or multiple electronic display elements (e.g., a display for each eye of a user). Examples of the electronic display element include: a liquid crystal display (LCD), an organic light emitting diode (OLED) display, an active-matrix organic light-emitting diode display (AMOLED), some other display, or some combination thereof.

The electronic display 115 includes a display area comprising a plurality of sub-pixels under each unit repeating pixel structure, where a sub-pixel is a discrete light emitting component, and a pixel structure includes a plurality of the same sub-pixels (e.g., red, blue, green). Different sub-pixels are separated from each other by dark space regions. A dark space region is the portion of the display area that does not emit light. For example, a sub-pixel emits red light, yellow light, blue light, green light, white light, or any other suitable color of light. In some embodiments, images projected by the electronic display 115 are rendered on the sub-pixel level. This is distinct from, say an RGB (red-green-blue) layout, which has discrete red, green, and blue pixels (red, green, and blue) and each pixel in the RGB layout includes a red sub-pixel, which is adjacent to a green sub-pixel that is adjacent to a blue sub-pixel; the red, green, and blue sub-pixels operate together to form different colors. In an RGB layout a sub-pixel in a pixel is restricted to working within that pixel. However, in some embodiments, sub-pixels in the electronic display operate within multiple "logical" pixels in their surrounding vicinity to form different colors. The sub-pixels are arranged on the display area of the electronic display 115 in a sub-pixel array. Examples of a sub-pixel array include PENTILE® RGBG, PENTILE® RGBW, some another suitable arrangement of sub-pixels that renders images at the sub-pixel level. In some embodiments, one or more adjacent sub-pixels are of the same color.

Each sub-pixel emits light according to an emission distribution. In some embodiments, the sub-pixels have relatively broad emission distribution (e.g., a Lambertian emission distribution or something similar). An emission distribution describes a range of angles of light emitted from a sub-pixel. The emission distribution can be quantified in terms of solid angle. A solid angle is a 3 dimensional analog of an ordinary angle such as that subtended by a cone and is measured in steradians.

The microlens array 116 includes a plurality of microlenses that direct light emitted from the electronic display 115 toward the optics block 118. The microlens array 116 is affixed directly to the display area of the electronic display 115. Additionally, in some embodiments, the microlens array may be fabricated as part of the electronic display 115. The microlens is positioned relative to the electronic display 115 such that for a single microlens, the microlens receives light from a single corresponding sub-pixel. Also, in some embodiments, a microlens is positioned relative to the electronic display 115 such that the microlens receives light from a pixel.

The microlenses are shaped to reduce the solid angle associated with the emission distributions of corresponding sub-pixels. A reduction in solid angle corresponds to a tighter (e.g., more collimated) emission distribution. Due to optical relationships, as the emission distribution is concentrated, the apparent spatial extent of the emission area is seen to grown in size (which accounts for optically filling in the 'screen-door' effect). Accordingly, each microlens is essentially a light gathering tool that turns a relatively broad emission distribution (e.g., Lambertian distribution) into a relatively directional distribution pattern (e.g., more beam like), with a net apparent increase in the emission area as viewed by the user. Moreover, in some embodiments, the relative position between a microlens and its corresponding sub-pixel (or pixel) varies based on the location of the sub-pixel (or pixel) on the display panel. The variation in relative position allows microlenses to direct light from a corresponding sub-pixel (or pixel) to the optics block 118. Accordingly, the microlens array 116 concentrates emission distributions toward the optics block 118. Concentration of an emission distribution is the tightening of the emission distribution and directing an emission distribution towards a target region. The concentration of an emission distribution increases exitance (emitted intensity [watts/steradian]) which effectively brightens the sub-pixels as perceived by the user (potentially by over an order of magnitude). In this embodiment, the target region includes an optics block 118 which ultimately passes light to regions (i.e., eyeboxes) expected to include eyes of a user of the VR headset 105. Accordingly, concentration of the emission distributions results in more light being directed toward eyeboxes. The relative positioning of a microlens to a corresponding sub-pixel is discussed in detail below with regard to FIG. 3A-5B.

Additionally, in some embodiments, the microlenses are designed to diffuse (i.e., spread out) light emitted from the sub-pixels to generate blur spots in the image light that both facilitate masking a dark space region between adjacent sub-pixels and maintaining a specific eyebox size. An eyebox is typically specified as being equal to or larger than a human pupil diameter, notionally on the order of 10 millimeters. Additionally, in some embodiments, a specified size of an eyebox may be a range of values. For example, between 10 and 20 mm. A blur spot for a given sub-pixel is a diffused image of a sub-pixel, which cannot be compensated by a user's accommodation. Specific embodiments of microlenses that diffuse light are discussed in detail below with regard to FIGS. 5A-5D. The microlens array 116 outputs the blurred image light to the optics block 118, allowing the blurred image light to act as a pre-distortion of the image light that, when magnified by the optics block 118, corrects for fixed pattern noise in the image presented to the user and maintains the spatial extent of the eyebox. Additionally, these microlenses may be relatively close to each other to achieve a "dense packing" arrangement (hexagonal or rectangular, as related to sub-pixel or pixel architecture) to maximize masking the dark space region between adjacent sub-pixels. In a dense packing arrangement there is no or very limited space (as may be utilized for support structure or light blocking features) between adjacent microlenses. The dense packing arrangement may be, e.g., hexagonal, rectangular, square, or some other shape where there is no space between adjacent microlenses (i.e., each microlens is formed in the other shape and directly abuts its adjacent microlenses). For example, microlenses in a hexagonal dense packing arrangement have hexagonal shapes and abut directly to other hexagonal microlenses.

The optics block 118 magnifies received light (e.g., the blurred image light output from the microlens array 116), corrects optical errors associated with the image light, and presents the corrected image light is presented to a user of the VR headset 105. An optical element may be an aperture, a Fresnel lens, a convex lens, a concave lens, a filter, or any other suitable optical element that affects the blurred image light. Moreover, the optics block 118 may include combinations of different optical elements. In some embodiments, one or more of the optical elements in the optics block 118 may have one or more coatings, such as partially reflective, polarization filters, and/or anti-reflective coatings.

Magnification of the image light by the optics block 118 allows the electronic display 115 to be physically smaller, weigh less, and consume less power than larger displays. Additionally, magnification may increase a field of view of the displayed media. For example, the field of view of the displayed media is such that the displayed media is presented using almost all (e.g., 110 degrees diagonal), and in some cases all, of the user's field of view. However, magnification of non-blurred image light may cause an increase in fixed pattern noise, also referred to as the "screen-door effect," which is a visual artifact where a dark space region separating pixels and/or sub-pixels of a display become visible to a user in an image presented by the display. However, the optics block 118 magnifies blurred image light so the images of adjacent sub-pixels are distinguishable and blurred to cover the dark space region between the adjacent sub-pixels. In some embodiments, the optics block 118 is designed so its effective focal length is larger than the spacing to the electronic display 115, which magnifies the image light projected by the electronic display 115. Additionally, in some embodiments, the amount of magnification may be adjusted by adding or removing optical elements.

The optics block 118 may be designed to correct one or more types of optical error in addition to fixed pattern noise (i.e., the screen-door effect). Examples of optical error include: two dimensional optical errors, three dimensional optical errors, or some combination thereof. Two dimensional errors are optical aberrations that occur in two dimensions. Example types of two dimensional errors include: barrel distortion, pincushion distortion, longitudinal chromatic aberration, transverse chromatic aberration, or any other type of two-dimensional optical error. Three dimensional errors are optical errors that occur in three dimensions. Example types of three dimensional errors include spherical aberration, comatic aberration, field curvature, astigmatism, or any other type of three-dimensional optical error. In some embodiments, content provided to the electronic display 115 for display is pre-distorted, and the optics block 118 corrects the distortion when is receives image light from the electronic display 115 generated based on the content.

The locators 120 are objects located in specific positions on the VR headset 105 relative to one another and relative to a specific reference point on the VR headset 105. A locator 120 may be a light emitting diode (LED), a corner cube reflector, a reflective marker, a type of light source that contrasts with an environment in which the VR headset 105 operates, or some combination thereof. In embodiments where the locators 120 are active (i.e., an LED or other type of light emitting device), the locators 120 may emit light in the visible band (~380 nm to 750 nm), in the infrared (IR) band (~750 nm to 10 micrometers), in the ultraviolet band (10 nm to 380 nm), some other portion of the electromagnetic spectrum, or some combination thereof.

In some embodiments, the locators 120 are located beneath an outer surface of the VR headset 105, which is transparent to the wavelengths of light emitted or reflected by the locators 120 or is thin enough to not substantially attenuate the wavelengths of light emitted or reflected by the locators 120. Additionally, in some embodiments, the outer surface or other portions of the VR headset 105 are opaque in the visible band of wavelengths of light. Thus, the locators 120 may emit light in the IR band under an outer surface that is transparent in the IR band but opaque in the visible band.

The IMU 130 is an electronic device that generates fast calibration data based on measurement signals received from one or more of the position sensors 125. A position sensor 125 generates one or more measurement signals in response to motion of the VR headset 105. Examples of position sensors 125 include: one or more accelerometers, one or more gyroscopes, one or more magnetometers, another suitable type of sensor that detects motion, a type of sensor used for error correction of the IMU 130, or some combination thereof. The position sensors 125 may be located external to the IMU 130, internal to the IMU 130, or some combination thereof.

Based on the one or more measurement signals from one or more position sensors 125, the IMU 130 generates fast calibration data indicating an estimated position of the VR headset 105 relative to an initial position of the VR headset 105. For example, the position sensors 125 include multiple accelerometers to measure translational motion (forward/back, up/down, left/right) and multiple gyroscopes to measure rotational motion (e.g., pitch, yaw, roll). In some embodiments, the IMU 130 rapidly samples the measurement signals and calculates the estimated position of the VR headset 105 from the sampled data. For example, the IMU 130 integrates the measurement signals received from the accelerometers over time to estimate a velocity vector and integrates the velocity vector over time to determine an estimated position of a reference point on the VR headset 105. Alternatively, the IMU 130 provides the sampled measurement signals to the VR console 110, which determines the fast calibration data. The reference point is a point that may be used to describe the position of the VR headset 105. While the reference point may generally be defined as a point in space; however, in practice the reference point is defined as a point within the VR headset 105 (e.g., a center of the IMU 130).

The IMU 130 receives one or more calibration parameters from the VR console 110. As further discussed below, the one or more calibration parameters are used to maintain tracking of the VR headset 105. Based on a received calibration parameter, the IMU 130 may adjust one or more IMU parameters (e.g., sample rate). In some embodiments, certain calibration parameters cause the IMU 130 to update an initial position of the reference point so it corresponds to a next calibrated position of the reference point. Updating the initial position of the reference point as the next calibrated position of the reference point helps reduce accumulated error associated with the determined estimated position. The accumulated error, also referred to as drift error, causes the estimated position of the reference point to "drift" away from the actual position of the reference point over time.

The imaging device 135 generates slow calibration data in accordance with calibration parameters received from the VR console 110. Slow calibration data includes one or more images showing observed positions of the locators 120 that are detectable by the imaging device 135. The imaging device 135 may include one or more cameras, one or more video cameras, any other device capable of capturing images including one or more of the locators 120, or some combination thereof. Additionally, the imaging device 135 may include one or more filters (e.g., used to increase signal to noise ratio). The imaging device 135 is configured to detect light emitted or reflected from locators 120 in a field of view of the imaging device 135. In embodiments where the locators 120 include passive elements (e.g., a retroreflector), the imaging device 135 may include a light source that illuminates some or all of the locators 120, which retro-reflect the light towards the light source in the imaging device 135. Slow calibration data is communicated from the imaging device 135 to the VR console 110, and the imaging device 135 receives one or more calibration parameters from the VR console 110 to adjust one or more imaging parameters (e.g., focal length, focus, frame rate, ISO, sensor temperature, shutter speed, aperture, etc.).

The VR input interface 140 is a device that allows a user to send action requests to the VR console 110. An action request is a request to perform a particular action. For example, an action request may be to start or end an application or to perform a particular action within the application. The VR input interface 140 may include one or more input devices. Example input devices include: a keyboard, a mouse, a game controller, or any other suitable device for receiving action requests and communicating the received action requests to the VR console 110. An action request received by the VR input interface 140 is communicated to the VR console 110, which performs an action corresponding to the action request. In some embodiments, the VR input interface 140 may provide haptic feedback to the user in accordance with instructions received from the VR console 110. For example, haptic feedback is provided when an action request is received, or the VR console 110 communicates instructions to the VR input interface 140 causing the VR input interface 140 to generate haptic feedback when the VR console 110 performs an action.

The VR console 110 provides media to the VR headset 105 for presentation to the user in accordance with information received from one or more of: the imaging device 135, the VR headset 105, and the VR input interface 140. In the example shown in FIG. 1, the VR console 110 includes an application store 145, a tracking module 150, and a virtual reality (VR) engine 155. Some embodiments of the VR console 110 have different modules than those described in conjunction with FIG. 1. Similarly, the functions further described below may be distributed among components of the VR console 110 in a different manner than is described here.

The application store 145 stores one or more applications for execution by the VR console 110. An application is a group of instructions, that when executed by a processor, generates content for presentation to the user. Content generated by an application may be in response to inputs received from the user via movement of the HR headset 105 or the VR interface device 140. Examples of applications include: gaming applications, conferencing applications, video playback application, or other suitable applications.

The tracking module 150 calibrates the VR system 100 using one or more calibration parameters and may adjust one or more calibration parameters to reduce error in determination of the position of the VR headset 105. For example, the tracking module 150 adjusts the focus of the imaging device 135 to obtain a more accurate position for observed locators on the VR headset 105. Moreover, calibration performed by the tracking module 150 also accounts for information received from the IMU 130. Additionally, if tracking of the VR headset 105 is lost (e.g., the imaging device 135 loses line of sight of at least a threshold number of the locators 120), the tracking module 140 re-calibrates some or all of the system environment 100.

The tracking module 150 tracks movements of the VR headset 105 using slow calibration information from the imaging device 135. As further described below in conjunction with FIG. 3, the tracking module 150 determines positions of a reference point of the VR headset 105 using observed locators from the slow calibration information and a model of the VR headset 105. The tracking module 150 also determines positions of a reference point of the VR headset 105 using position information from the fast calibration information. Additionally, in some embodiments, the tracking module 150 may use portions of the fast calibration information, the slow calibration information, or some combination thereof, to predict a future location of the headset 105. The tracking module 150 provides the estimated or predicted future position of the VR headset 105 to the VR engine 155.

The VR engine 155 executes applications within the system environment 100 and receives position information, acceleration information, velocity information, predicted future positions, or some combination thereof of the VR headset 105 from the tracking module 150. Based on the received information, the VR engine 155 determines content to provide to the VR headset 105 for presentation to the user. For example, if the received information indicates that the user has looked to the left, the VR engine 155 generates content for the VR headset 105 that mirrors the user's movement in a virtual environment. Additionally, the VR engine 155 performs an action within an application executing on the VR console 110 in response to an action request received from the VR input interface 140 and provides feedback to the user that the action was performed. The provided feedback may be visual or audible feedback via the VR headset 105 or haptic feedback via the VR input interface 140.

Figure 2A:
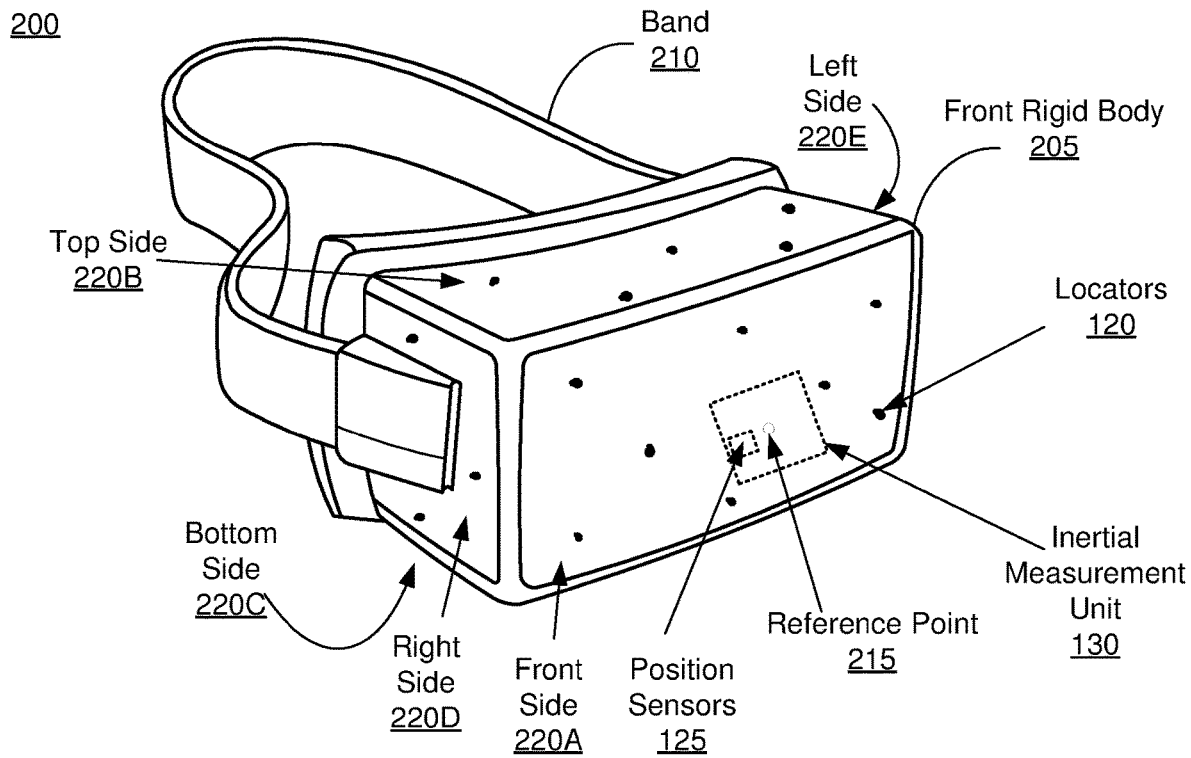
FIG. 2A is a wire diagram of a virtual reality (VR) headset, in accordance with an embodiment.

FIG. 2A is a wire diagram of a VR headset 200, in accordance with an embodiment. The VR headset 200 is an embodiment of the VR headset 105, and includes a front rigid body 205 and a band 210. The front rigid body 205 includes one or more electronic display elements of the electronic display 115 (not shown), the IMU 130, the one or more position sensors 125, and the locators 120. In the embodiment shown by FIG. 2A, the position sensors 125 are located within the IMU 130, and neither the IMU 130 nor the position sensors 125 are visible to the user.

The locators 120 are located in fixed positions on the front rigid body 205 relative to one another and relative to a reference point 215. In the example of FIG. 2A, the reference point 215 is located at the center of the IMU 130. Each of the locators 120 emit light that is detectable by the imaging device 135. Locators 120, or portions of locators 120, are located on a front side 220A, a top side 220B, a bottom side 220C, a right side 220D, and a left side 220E of the front rigid body 205 in the example of FIG. 2A.

Figure 2B:
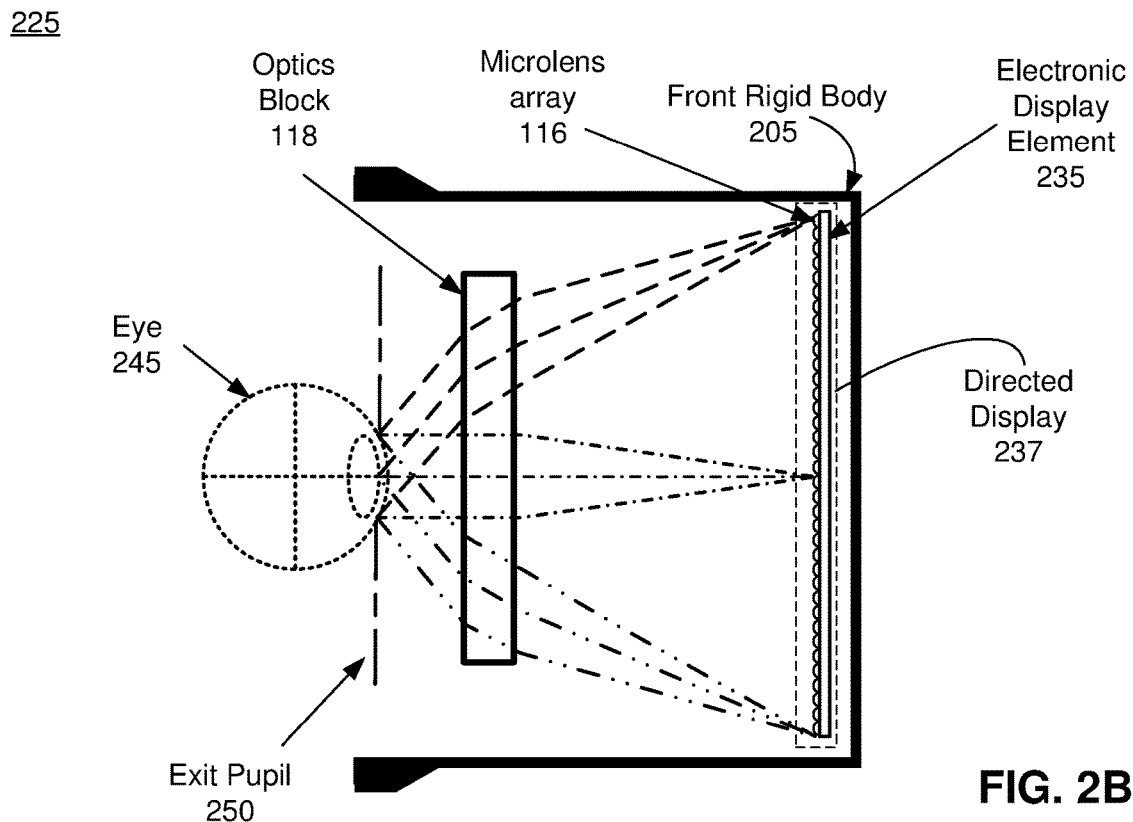
FIG. 2B is a cross section of the front rigid body of the embodiment of a VR headset shown in FIG. 2A

FIG. 2B is a cross section 225 of the front rigid body 205 of the embodiment of a VR headset 200 shown in FIG. 2A. As shown in FIG. 2B, the front rigid body 205 includes a directional display 112 and an optics block 118. The directional display 112 emits directional light toward the optics block 118. Directional light is composed of light emitted from various sub-pixels and/or pixels in the directional display 112 that have concentrated emission distributions.

The directional display 112 includes an electronic display element 235 of the electronic display 115 and a microlens array 116. The electronic display element 235 emits image light, and the microlens array 116 concentrates the image light towards the optics block 118. As the light directed toward the optics block 118 is concentrated, less off-axis light is lost (as opposed to a case with no microlens array 116) and more light is ultimately directed toward the eye 245.

The optics block 118 alters (e.g., magnifies) the received light and provides it to an exit pupil 250 for presentation to the user. The exit pupil 250 is the location of the front rigid body 205 where a user's eye 245 is positioned, also referred to as the "eyebox". For purposes of illustration, FIG. 2B shows a cross section 225 associated with a single eye 245, but another optics block, separate from the optics block 118, provides altered image light to another eye of the user.

Additionally, in some embodiments, the microlens array 116 may also blur the image light that is concentrated toward the optics block 118. An image that is corrected for fixed pattern noise is then generated by the optics block 118 magnifying the blurred image light. In some embodiments, the optics block 118 may also correct for one or more additional optical errors (e.g., distortion, astigmatism, etc.).

Figure 3A:
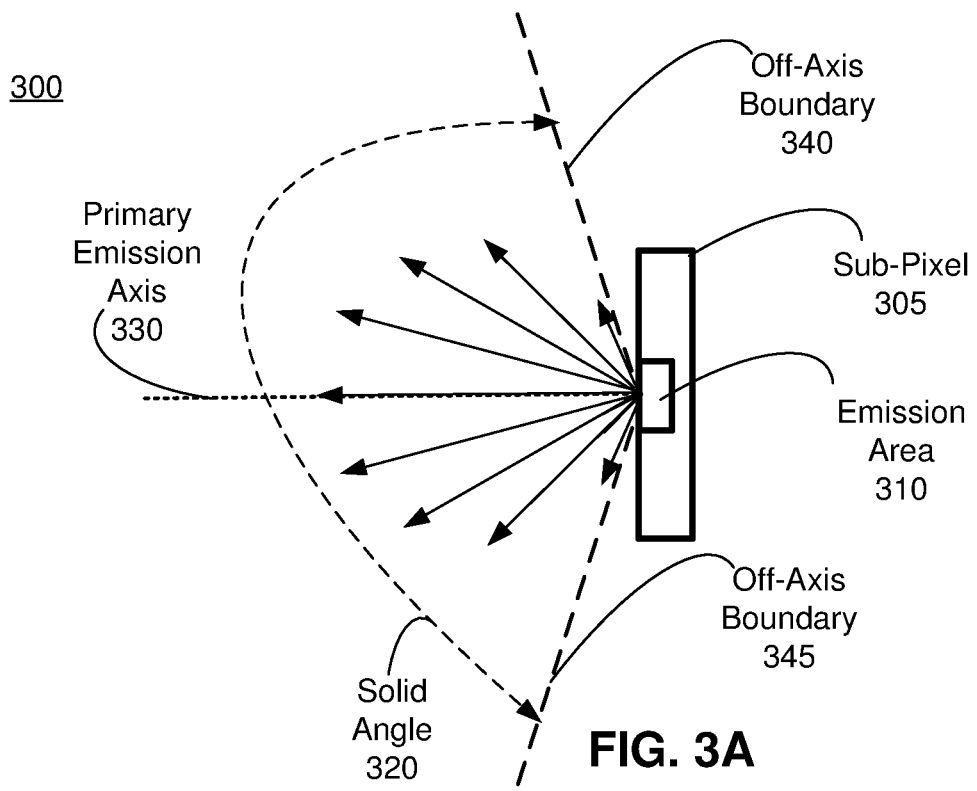
FIG. 3A illustrates a cross section of a sub-pixel emitting light, according to an embodiment.

FIG. 3A illustrates a cross section 300 of a sub-pixel 305 emitting light, according to an embodiment. The sub-pixel 305 includes an emission area 310 that emits light according to an emission distribution. The emission distribution has a primary emission axis 330 and off-axis boundaries 340 and 345. The primary emission axis 330 is a direction that the emission area 310 emits light with the most intensity. In cases where the emission distribution is Lambertian the intensity for an off-axis ray is based in part on the cosine of an angle subtending the off-axis ray and the primary emission axis 330. In this embodiment, the emission distribution has a solid angle 320 that subtends the off-axis boundaries 340 and 345. The emission distribution may be rotationally symmetric or rotationally asymmetric around the primary emission axis 330.

Additionally, while this example shows the primary emission axis 330 being perpendicular to the emission area 310, in some embodiments, the primary emission axis 330 may be pointing in some other direction.

As the emissions distribution for various sub-pixels of the same color are generally going to be the same, it is apparent the location of the sub-pixel 305 affects have a strong effect regarding how much light makes it to an eye of the viewing user. For example, assuming the sub-pixel 305 is located in the center of the electronic display 115 light emitted near the off-axis boundaries 340 and 345 (e.g., for example around 70%) may not reach the viewing user and potentially cause stray-light in a HMD system. And the problem is exacerbated for sub-pixels on a periphery of the electronic display 115, as a larger portion of the emitted light does not make it to the optics block 118 (e.g., for example around 90%).

Figure 3B:
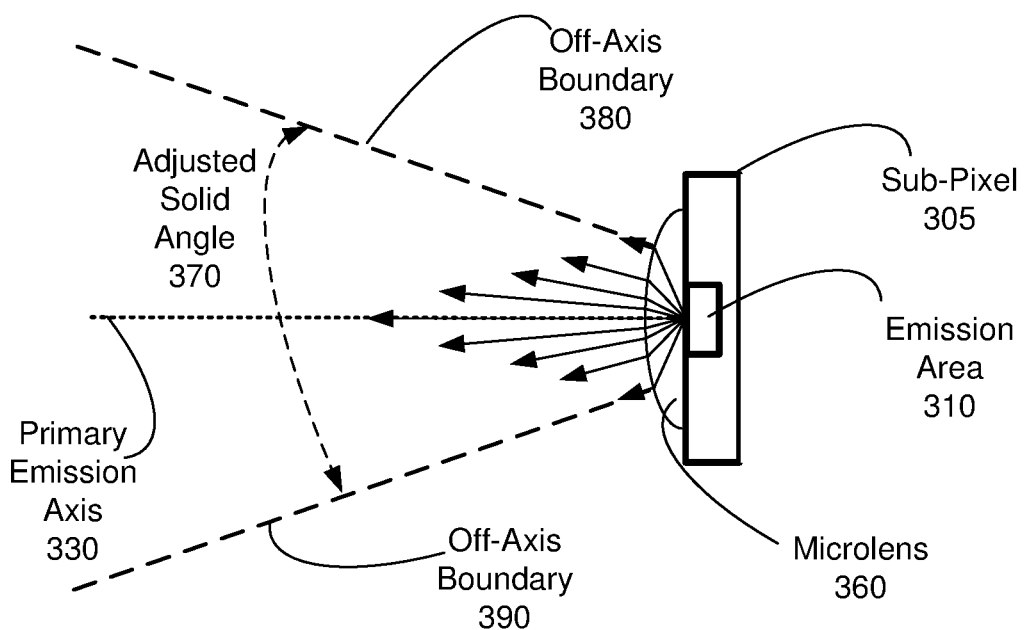
FIG. 3B illustrates a cross section of the sub-pixel shown in FIG. 3A and a corresponding microlens, according to an embodiment.

FIG. 3B illustrates a cross section 350 of the sub-pixel 305 and a corresponding microlens 360, according to an embodiment. The microlens 310 is a net positive lens that concentrates the emission distribution of the sub-pixel 305. Concentration of an emission distribution is the tightening of the emission distribution and the directing of the tightened emission distribution towards a target region (e.g., the optics block 118). A position of the microlens 360 relative to the emission area 310 is referred to as a microlens offset. The microlens offset is described as a position of a microlens optical axis relative to a corresponding sub-pixel centroid. A shape of the microlens 360 and the microlens offset adjust the solid angle 320 to an adjusted solid angle 370. In this embodiment, the adjusted solid angle 370 is less than the solid angle 320, which means that the emission distribution is more directed than that discussed above with regard to FIG. 3A.

Additionally, the shape of the micro-lens 360 and the microlens offset are designed to orient the primary emission axis 330 toward a specific direction. Accordingly, a shape of the micro-lens 360 and/or a microlens offset can be adjusted to generate a primary axis of emission along a particular direction. As an example, this emission direction may be approximately normal to the display surface for an on-axis sub-pixel position, but approach 30 degrees at the periphery of the display (still relative to the display normal vector).

Figure 4:
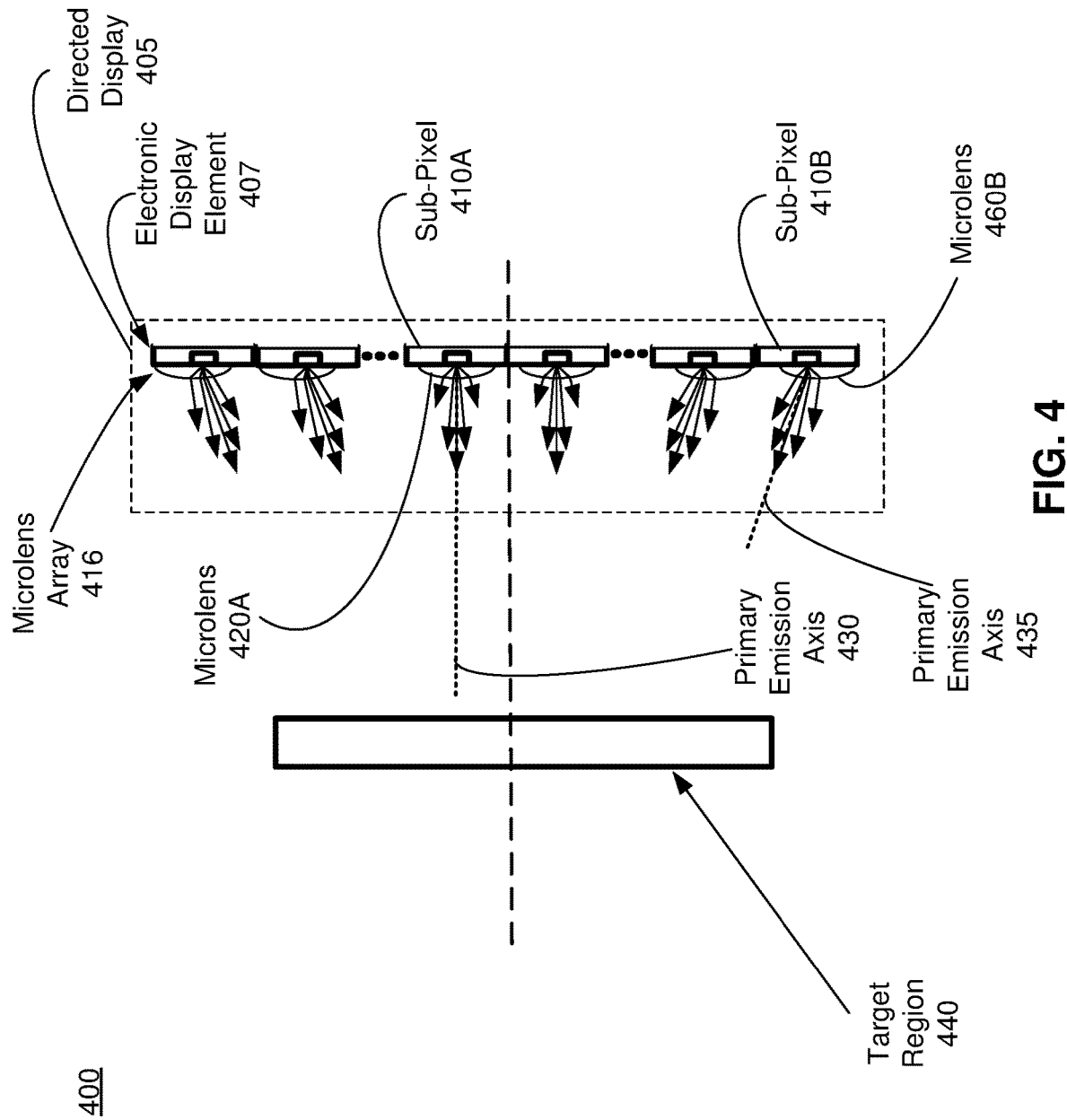
FIG. 4 illustrates a cross section of a directed display, according to an embodiment.

FIG. 4 illustrates a cross section 400 of a directed display 405, according to an embodiment. In some embodiments, the directed display 405 is a component (e.g., directed display 112) of the VR headset 105. In alternate embodiments, the directed display 405 is part of some other HMD or other system that directs display light to a particular location.

The directed display 405 includes an electronic display element 407 and a microlens array 416. The electronic display element 407 is substantially similar to the electronic display element 235.

The electronic display element 407 includes a plurality of sub-pixels, the plurality including a sub-pixel 410A near a center portion of the electronic display element 407 and a sub-pixel 410B on a periphery of the electronic display element 407. The sub-pixels may be substantially similar to the sub-pixels 310 described above with references to FIGS. 3A and 3B. Each of the sub-pixels 410 emits light in a particular emission distribution. For simplicity, it is assumed that the emission distribution is the same regardless of sub-pixel color. However, in other embodiments, the emission distribution may vary based on, e.g., color of the emitting sub-pixel 410.

The microlens array 416 includes a plurality of microlenses that concentrate the light emitted from the electronic display element 407 towards a target region 440. The target region 440 is a region and/or component that receives the concentrated light. For example, the target region 440 may be an optics block (e.g., optics block 118), or more specifically the exit/entrance pupil of the optical blocks in a HMD, an eyebox (i.e., a region of space where a viewer's eye is located), some component of an HMD, etc. The plurality of microlenses includes a microlens 420A that is coupled to the sub-pixel 410B, and microlens 420B that is coupled to the sub-pixel 420B.

For a given sub-pixel and corresponding microlens, a microlens offset and a shape of the microlens are designed based on a position of the given sub-pixel in the electronic display element 407. For the sub-pixels near the center of the electronic display 115 (e.g., microlens 420A) the shapes of the microlenses may have a flatter center (less curvature), but stronger curvature along the peripheries. For example, light emitted near off-axis boundaries is rather strongly bent by the microlens 420A toward a primary emission axis 430, whereas a much weaker bending occurs for light emitted near the primary emission axis 430.

In contrast, for sub-pixels that are near a periphery (e.g., sub-pixel 410B) of the electronic display element 407, the micolenses (e.g., microlens 410B) are shaped to bend the emitted light toward the target region 440. Additionally, the microlenses near the periphery of the electronic display 407 may have microlens offsets that facilitate light emitted from the emission area being incident on curved surfaces (stronger refraction). For example, the microlens 420B is clearly positioned differently relative to its corresponding sub-pixel 410B than the microlens 420A's position relative to its corresponding sub-pixel 410A. For a given microlens, an amount of microlens offset and a shape of the microlens are designed to concentrate light emitted from a corresponding sub-pixel toward the target region 440.

In addition, the optical design of the microlens as a function of radial or X/Y-axis position on the display can be a variable to allow further improvement and customization in the resulting system design. For instance, sub-pixel 410A may have a spherical shaped microlens with a radius defined by R, while sub-pixel 410B could have an aspherical shaped microlens with a radius of Y times R. This allows for both a microlens array that has the same lens properties repeated across the array (potentially easier to fabricate in mass quantities), or supports a microlens design that is optimized for its particular display coordinate (relative to the optical axis of the optics block 118).

Turning now to a discussion regarding embodiments of microlenses designed to diffuse (i.e., spread out) light emitted from the sub-pixels. In these embodiments, the microlenses concentrate the light emitted from the sub-pixels and/or pixels but also slightly diffuse the emitted light to jointly eliminate the 'screen-door' effect (dark space region between adjacent sub-pixels) and maintain the eyebox size. This results in a minimum blur diameter of the sub-pixel through the optics block 118, to generate the eyebox for the user, while also creating some apparent blur in the perceived image to fill in the dark space region (here blur is defined as a compensation to the fixed-pattern noise, defined also as 'screen-door' effect, that cannot be affected by the users visual accommodation system). A blur spot for a given sub-pixel is therefore a diffused image of a sub-pixel.

Figure 5A:
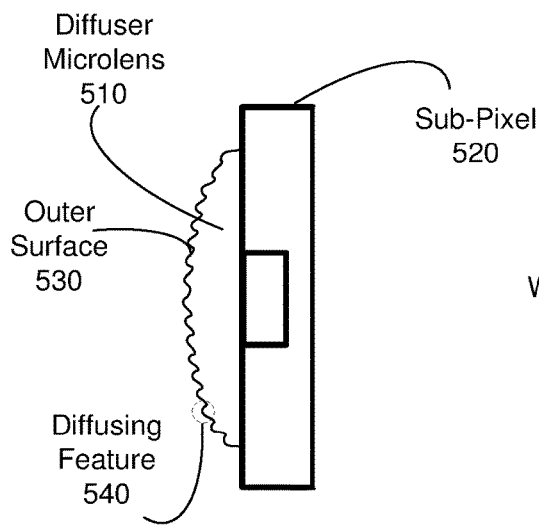
FIG. 5A illustrates a diffuser microlens coupled to a sub-pixel, according to an embodiment.

FIG. 5A illustrates a sub-pixel 520 coupled to a diffuser microlens 510, according to an embodiment. The diffuser microlens 510 has a microlens offset (optical axis relative to a corresponding sub-pixel centroid) and shape that concentrate light emitted from the sub-pixel 520. In this embodiment, the shape of the lens refers to the general curvature of an outer surface 530. The outer surface 530 includes a plurality of diffusing features 540. A diffusing feature blurs the light transmitted by the microlens 510. A diffusing feature 540 may be, e.g., a Fresnel structure, an engineered diffuser, an aspherical surface, a polynomial surface, a sinusoidal variance to a surface of the microlens 510 (e.g., the outer surface 530), some other feature that blurs light, or some combination thereof. The blurred image light helps allow the gain of the microlens structure to wash out the "screen-door" effect, such that any dark space region between sub-pixels is not visible to a viewing user, while maintaining at least a minimum eyebox size.

Figure 5B:
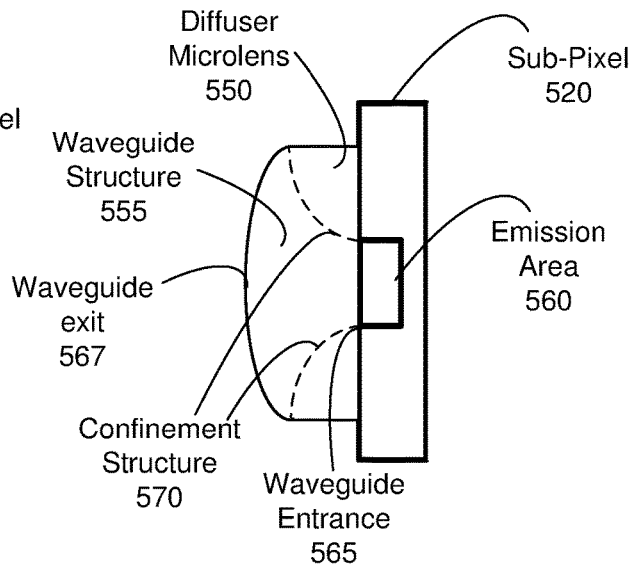
FIG. 5B illustrates an example of a sub-pixel coupled to a diffuser microlens including a waveguide structure, according to an embodiment.

FIG. 5B illustrates the sub-pixel 520 coupled to a diffuser microlens 550 that includes a waveguide structure 555, according to an embodiment. The waveguide structure includes a waveguide entrance 565, a waveguide exit 567, and a confinement structure 570. The waveguide entrance 565 receives light from an emission area 560. The received light propagates within the confinement structure 570 until it reaches the waveguide exit 567. The confinement structure 570 is tapered such that light within the waveguide structure 555 is tightly confined near the emission area 560, but the confinement relaxes as the light moves toward the waveguide exit 567. This change in confinement allows a larger net increase in collected light (with rays near plus or minus 90 degrees relative to the display surface normal vector) while preventing high-angle cross-talk or stray light, and blurs the light emitted from the diffuser microlens 550, which again may be used to mitigate the screen-door effect.

Figure 5C:
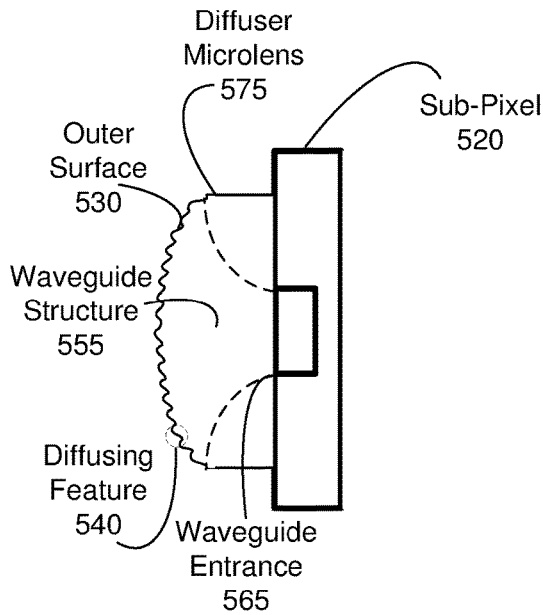
FIG. 5C illustrates an example of a sub-pixel 52 coupled to a diffuser microlens that includes a waveguide structure and a plurality of diffusing features, according to an embodiment.

FIG. 5C illustrates an example of the sub-pixel 520 coupled to a diffuser microlens 575 that includes the waveguide structure 555 and a plurality of diffusing features 540, according to an embodiment. In this example, the diffuser microlens 575 is substantially similar to the diffuser microlens 550 in FIG. 5B, except that the diffuser microlens 575 also includes a plurality of diffusing features 540 (e.g., as discussed above with regard to FIG. 5A) on the outer surface 530 of the diffusing microlens 575.

Figure 5D:
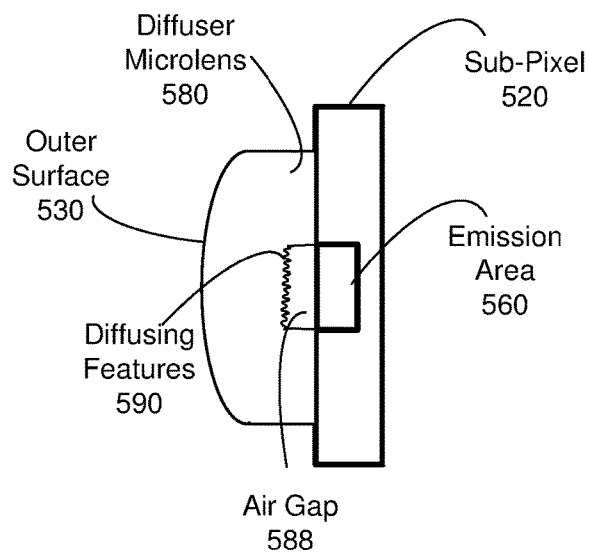
FIG. 5D illustrates another example of the sub-pixel coupled to a diffuser microlens including internal diffusing features, according to an embodiment.

FIG. 5D illustrates another example of the sub-pixel 520 coupled to a diffuser microlens 580 including internal diffusing features 540, according to an embodiment. The diffuser microlens 580 includes a material 588 of a different index than that of the diffuser microlens 580, between the emission area 560 diffusing features 590 (i.e., a plurality of the diffusing features 540). In some embodiments the material 588 may be air, plastic polymer, a material having an index differing by at least 5% from the diffuser microlens 580, or some combination thereof. Accordingly, in this embodiment, the light is blurred by the plurality of diffusing features 590 prior to reaching the outer surface 530 of the diffuser microlens 580.

Figure 6A:
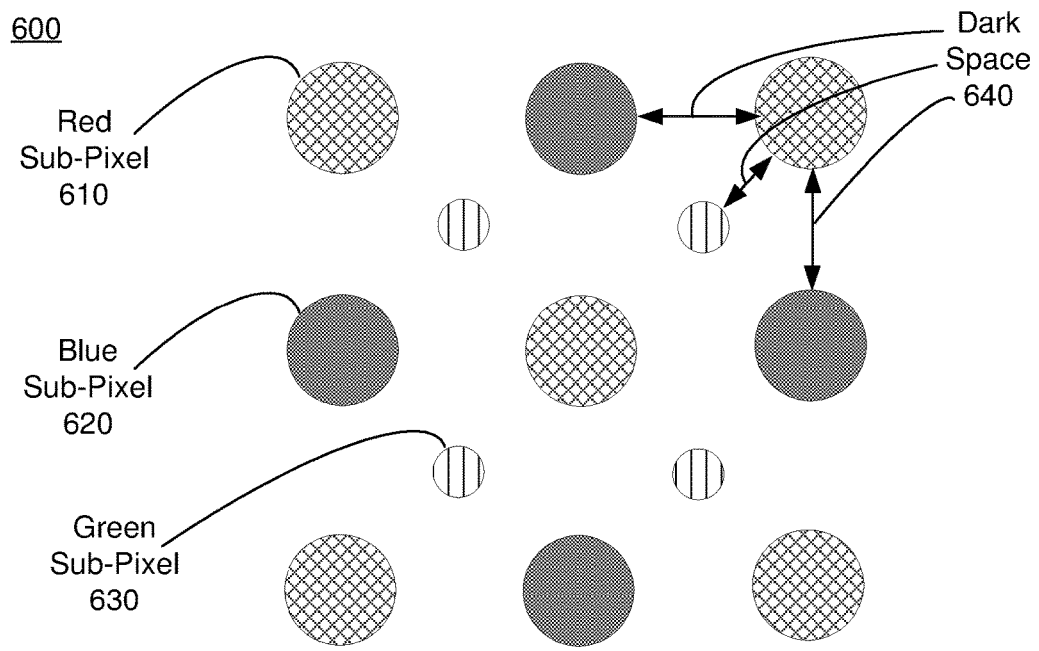
FIG. 6A is an example array of sub-pixels on the electronic display element.

FIG. 6A is an example array 600 of sub-pixels on the electronic display element 235, according to an embodiment. The example array 600 includes red sub-pixels 610, blue sub-pixels 620, and green sub-pixels 330. For example, the array 600 is portion of a PENTILE® display. A dark space region 640 separates each sub-pixel from one or more adjacent sub-pixels. The dark space region 640 is a portion of the array 600 that does not emit light, and may become visible to a user under certain circumstances (e.g., magnification) causing the screen-door effect that degrades image quality and the resulting VR or AR experience. As discussed above in conjunction with FIG. 2B, the optical block 118 includes one or more optical elements configured to magnify the blurred image light transmitted by the microlens array 116 to reduce fixed pattern noise so the dark space region 640 between the sub-pixels is not visible to the user. The microlens array 116 includes a plurality of diffusing microlenses that are configured to blur image light generated from each sub-pixel and the optics block 118 is configured to magnify the blurred image light. The amounts of blur and magnification for image light generated from different sub pixels are determined so adjacent blur spots in the corrected image light are large enough to mask the dark space region 640 between adjacent sub-pixels, while still allowing the image light from adjacent sub-pixels to be resolved by a user as image light from separate sub-pixels.

Figure 6B:
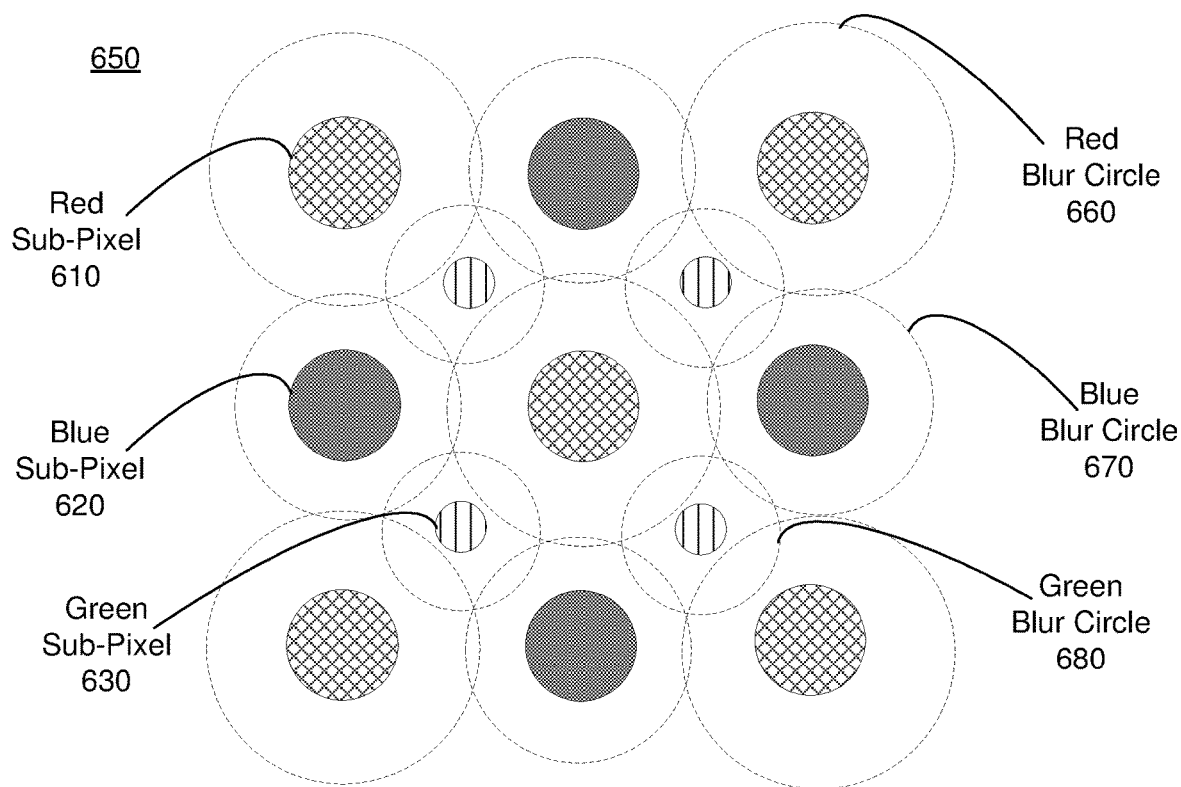
FIG. 6B is an example of image light emitted by an array of sub-pixels and adjusted by a microlens array and an optics block, according to an embodiment.

FIG. 6B is an example of image light 650 emitted by an array of sub-pixels (e.g., array 600) and adjusted by the microlens array 116 and the optics block 118, according to an embodiment. As shown in FIG. 6B, each of the sub-pixels has an associated blur spot (combination of ray and diffraction properties). Specifically, the red sub-pixels 610 have a corresponding red blur spot 660, the blue sub-pixels 620 have a corresponding blue blur spot 670, and the green sub-pixels 630 have a corresponding green blur spot 680. A blur spot is an area filled with an image of a blurred sub-pixel. So long as a blur spot does not overlap with a point of maximum intensity of an adjacent blur spot, the two blur spots are resolvable as two adjacent sub-pixels. The shape of the blur spot is not necessarily a circle, but is rather an area including the blurred image of a sub-pixel. The diffusing microlenses in the microlens array 116 are configured to blur each sub-pixel so that after magnification by the optics block 118 the blur spots mask the dark space region 640 between adjacent sub-pixels.

Additional Configuration Information

The foregoing description of the embodiments has been presented for the purpose of illustration; it is not intended to be exhaustive or to limit the patent rights to the precise forms disclosed. Persons skilled in the relevant art can appreciate that many modifications and variations are possible in light of the above disclosure.

The language used in the specification has been principally selected for readability and instructional purposes, and it may not have been selected to delineate or circumscribe the inventive subject matter. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights, which is set forth in the following claims.

What is claimed is:

1. A directed display comprising:
   an electronic display element configured to output image light emitted from a plurality of sub-pixels, the sub-pixels having associated emission distributions that describe ranges of angles of the image light emitted from the plurality of sub-pixels; and
   a microlens array including microlenses that are each directly attached to a corresponding sub-pixel of the plurality of sub-pixels, the microlenses including a first microlens that has a corresponding first sub-pixel and a second microlens that has a corresponding second sub-pixel, and the first sub-pixel is closer to a center axis of the plurality of sub-pixels than the second sub-pixel, and each of the microlenses are configured to concentrate the image light and direct the concentrated image light toward a target region along a respective primary emission axis, wherein a primary emission axis of the first sub-pixel and the first microlens has less of an angle relative to the center axis than a primary emission axis of the second sub-pixel and the second microlens.

2. The directed display of claim 1, wherein one or more sub-pixels of the plurality of sub-pixels at different spatial positions of the electronic display element have different microlens offsets, the microlens offset for a sub-pixel of the plurality of sub-pixels being a position of a microlens optical axis relative to a corresponding sub-pixel centroid, and the microlens offset is such that the primary emission axis of the sub-pixel is directed by the microlens toward a common area of the target region.

3. The directed display of claim 1, wherein one or more sub-pixels of the plurality of sub-pixels at different spatial positions of the electronic display element have different microlens optical surface parameters.

4. The directed display of claim 1, wherein the microlenses include one or more diffuser microlenses, and the microlens array is further configured to generate blur spots in the image light that jointly mask a dark space region between adjacent sub-pixels of the plurality of sub-pixels, and wherein each of the blur spots are generated by diffusing the image light emitted by the plurality of sub-pixels.

5. The directed display of claim 4, wherein a diffuser microlens of the one or more diffuser microlenses is a microlens having an outer surface that includes a plurality of diffusing features.

6. The directed display of claim 5, wherein each diffusing feature of the plurality of diffusing features is selected from a group comprising: a Fresnel structure, an engineered diffuser, an aspherical surface, a polynomial surface, a sinusoidal variance to a surface of the diffuser microlens, and some other feature that blurs the image light.

7. The directed display of claim 4, wherein a diffuser microlens of the one or more diffuser microlenses includes a waveguide structure having a waveguide entrance coupled to a corresponding sub-pixel of the plurality of sub-pixels, a waveguide exit at an outer surface of the diffuser microlens, and a tapered confinement structure between the waveguide entrance and the waveguide exit.

8. The directed display of claim 4, wherein a diffuser microlens of the one or more diffuser microlenses is coupled to a sub-pixel and includes a material with a different refractive index profile, relative to the microlens structure, between an emission area of a sub-pixel and a portion of the diffuser microlens that includes a plurality of diffusing features.

9. The directed display of claim 1, wherein a first blur spot in the concentrated image light does not overlap with a point of maximum intensity of a second blur spot next to the first blur spot.

10. The directed display of claim 1, wherein the plurality of sub-pixels and the microlenses in the microlens array are arranged in a packaging arrangement selected from a group comprising: rectangular, square, hexagonal, and some other shape where at least a portion of the microlenses in the microlens array directly abut each other.

11. The directed display of claim 1, wherein the electronic display element and the microlens array are part of a head-mounted display (HMD) and the target region is an eyebox.

12. A display assembly comprising:
an electronic display element configured to output image light from a plurality of sub-pixels, the sub-pixels having associated emission distributions that describe ranges of angles of the image light emitted from the plurality of sub-pixels;
a microlens array including microlenses that are each directly attached to a corresponding sub-pixel of the plurality of sub-pixels, the microlenses including a first microlens that has a corresponding first sub-pixel and a second microlens that has a corresponding second sub-pixel, and the first sub-pixel is closer to a center axis of the plurality of sub-pixels than the second sub-pixel, and each of the microlenses are configured to concentrate the image light and direct the concentrated image light toward a target region along a respective primary emission axis, wherein a primary emission axis of the first sub-pixel and the first microlens has less of an angle relative to the center axis than a primary emission axis of the second sub-pixel and the second microlens; and
an optics block located in the target region, the optics block configured to:
mitigate one or more optical errors associated with the concentrated image light, and
direct the concentrated image light from the microlens array for presentation to a user.

13. The display assembly of claim 12, wherein the microlenses include one or more diffuser microlenses.

14. The display assembly of claim 13, wherein a diffuser microlens of the one or more diffuser microlenses is a microlens having an outer surface that includes a plurality of diffusing features.

15. The display assembly of claim 14, wherein each diffusing feature of the plurality of diffusing features is selected from a group comprising: a Fresnel structure, an engineered diffuser, an aspherical surface, a polynomial surface, a sinusoidal variance to a surface of the diffuser microlens, and some other feature that blurs the image light.

16. The display assembly of claim 13, wherein a diffuser microlens of the one or more diffuser microlenses includes a waveguide structure having a waveguide entrance coupled to a corresponding sub-pixel of the plurality of sub-pixels, a waveguide exit at an outer surface of the diffuser microlens, and a tapered confinement structure between the waveguide entrance and the waveguide exit.

17. The display assembly of claim 13, wherein a diffuser microlens of the one or more diffuser microlenses is coupled to a sub-pixel and includes another material with a different refractive index profile, relative to the microlens structure, between an emission area of a sub-pixel and a portion of the diffuser microlens that includes a plurality of diffusing features.

18. The display assembly of claim 13, wherein a first blur spot in the concentrated image light does not overlap with a point of maximum intensity of a second blur spot next to the first blur spot.

19. A method comprising:
emitting image light from a plurality of sub-pixels of an electronic display element, the sub-pixels separated from each other by a dark space region that does not emit light, and each sub-pixel of the plurality of sub-pixels has an associated emission distribution that describe a range of angles of the emitted image light;
generating, by a microlens array that includes microlenses each directly attached to a corresponding sub-pixel, apparent blur spots in the emitted image light that mask the dark space region between the sub-pixels, and wherein each of the blur spots are generated by diffusing the image light emitted by the plurality of sub-pixels;
concentrating, by the microlens array, the image light for each sub-pixel to reduce a respective solid angle associated with the emission distribution of each sub-pixel;
directing, by the microlens array, the concentrated image light toward a target region along a respective primary emission axis, wherein a primary emission axis of each sub-pixel and corresponding microlens is unique to that sub-pixel and microlens.

20. The method of claim 19, further comprising:
mitigating, by an optics block positioned in the target region, one or more optical errors associated with the concentrated image light; and
directing, by the optics block, the concentrated image light from the microlens array for presentation to a user.

* * * * *